(12) United States Patent
Takamori

(10) Patent No.: US 12,134,719 B2
(45) Date of Patent: Nov. 5, 2024

(54) HOT-MELT ADHESIVE

(71) Applicant: HENKEL AG & CO. KGAA, Duesseldorf (DE)

(72) Inventor: Ai Takamori, Osaka (JP)

(73) Assignee: Henkel AG & CO. KGaA, Duesseldorf (DE)

( * ) Notice: Subject to any disclaimer, the term of this patent is extended or adjusted under 35 U.S.C. 154(b) by 593 days.

(21) Appl. No.: 17/340,999

(22) Filed: Jun. 7, 2021

(65) Prior Publication Data

US 2021/0292606 A1   Sep. 23, 2021

Related U.S. Application Data

(63) Continuation of application No. PCT/JP2019/048077, filed on Dec. 9, 2019.

(30) Foreign Application Priority Data

Dec. 13, 2018 (JP) ................. 2018-233579

(51) Int. Cl.
*C09J 7/35* (2018.01)
*C08K 5/01* (2006.01)
*C08L 23/16* (2006.01)
*C08L 91/06* (2006.01)

(52) U.S. Cl.
CPC ................. *C09J 7/35* (2018.01); *C08K 5/01* (2013.01); *C08L 23/16* (2013.01); *C08L 91/06* (2013.01); *C08L 2205/03* (2013.01); *C08L 2314/06* (2013.01); *C09J 2301/304* (2020.08); *C09J 2423/16* (2013.01); *C09J 2491/00* (2013.01)

(58) Field of Classification Search
None
See application file for complete search history.

(56) References Cited

U.S. PATENT DOCUMENTS

| | | | | |
|---|---|---|---|---|
| 9,469,791 | B2 * | 10/2016 | Knutson | C08K 5/005 |
| 2013/0225752 | A1 * | 8/2013 | Tse | C09J 123/10 |
| | | | | 524/505 |
| 2015/0130480 | A1 | 5/2015 | Berkcan et al. | |
| 2015/0166850 | A1 * | 6/2015 | Tse | C09J 123/12 |
| | | | | 525/240 |
| 2016/0130480 | A1 | 5/2016 | Kauffman et al. | |
| 2018/0002579 | A1 | 1/2018 | Hu et al. | |
| 2021/0292605 | A1 * | 9/2021 | Takamori | C08L 23/0815 |

FOREIGN PATENT DOCUMENTS

JP   2012-177009 A   9/2012
JP   2017-538806 A   12/2017

OTHER PUBLICATIONS

International Preliminary Report on Patentability & Written Opinion PCT/JP2019/048077 Completed: Jun. 8, 2021; Mailing Date: Jun. 24, 2021 8 Pages.

* cited by examiner

*Primary Examiner* — Anish P Desai
(74) *Attorney, Agent, or Firm* — Sun Hee Lehmann

(57) ABSTRACT

Objective of the invention is to provide a hot-melt adhesive excellent in thermal resistance, good in adhesiveness over a wide range from low temperature to high temperature, and also excellent in thermal stability. Means for solving the problem is a hot-melt adhesive comprising an olefin copolymer (A), a tackifying resin (B) and a wax (C), wherein the olefin copolymer (A) comprises a metallocene-type ethylene/α-olefin copolymer (A1) having a melting point of 100 to 140° C.

3 Claims, No Drawings

HOT-MELT ADHESIVE

TECHNICAL FIELD OF THE INVENTION

The present invention relates to a hot-melt adhesive, and a product produced using the hot-melt adhesive.

BACKGROUND OF THE INVENTION

A hot-melt adhesive is an adhesive not containing a solvent, it is heated, melted and applied to an adherend, and then, solidified by being cooled to develop adhesiveness. Therefore, the hot-melt adhesive has features of enabling instant bonding and high-speed bonding, and is used in a wide variety of fields such as paper processing, woodworking, sanitary material and electronic fields.

As a base polymer of the hot-melt adhesive, there have generally been used, according to the intended use, for example, ethylene/carboxylate copolymers such as ethylene-vinyl acetate copolymers (hereinafter also referred to as "EVA"), ethylene-ethyl acrylate copolymers (hereinafter also referred to as "EEA"); polyolefins such as polyethylene, polypropylene and copolymers of ethylene and α-olefins; synthetic rubbers such as styrene-based block copolymers (for example, styrene-isoprene-styrene block copolymers, styrene-butadiene-styrene block copolymers and their hydrogenated products); polyurethanes; and the like.

Among these hot-melt adhesives, a hot-melt adhesive using polyolefins as a base polymer is used in various fields such as bookbinding, packaging, woodworking and nonwoven fabric (refer to JP 2017-538806 A and JP 2012-177009 A).

JP 2017-538806 A discloses a hot-melt adhesive comprising a semicrystalline propylene polymer as a polyolefin, a non-functionalized wax, and an ethylene-ethylenically unsaturated ester copolymer ([claim 1], [Table 1] through [Table 6]). The hot-melt adhesive of Patent Document 1 is useful for bonding various substrates including packaging, bags, boxes, cartons, cases, trays, multi-wall bags, bookbinding, paper products, including, e.g., paper towels (e.g., multiple use towels), toilet paper, facial tissue, wipes, tissues, towels (e.g., paper towels), and combinations thereof, as described in paragraph.

However, the hot-melt adhesive of JP 2017-538806 A has poor thermal resistance, and adhesiveness at high temperatures is not sufficient. When cardboard boxes are manufactured using the adhesive of JP 2017-538806 A, if the contents held in a cardboard box is warm, performance of the adhesive is not stable due to heat of the contents, and the assembled cardboard box may be opened.

JP 2012-177009 A discloses a hot-melt adhesive comprising a copolymer of ethylene/olefin having 3 to 20 carbon atoms, and a copolymer of ethylene/carboxylic acid ester. This hot-melt adhesive has reduced thread formation when jetted from a hot melt gun ([claim 1], [Table 1] through [Table 2]). However, the hot-melt adhesive of JP 2012-177009 A has also still room for improvement in thermal resistance after bonding and adhesiveness at high temperatures.

SUMMARY OF THE INVENTION

Problems to be Solved by Invention

The present invention solves the above conventional problems, and it is an objective of the present invention to provide a hot-melt adhesive excellent in thermal resistance, good in adhesiveness over a wide range from low temperature to high temperature, and also excellent in thermal stability.

Means for Solving Problems

The present invention provides a hot-melt adhesive comprising an olefin copolymer (A), a tackifying resin (B) and a wax (C), wherein
the olefin copolymer (A) comprises a metallocene-type ethylene/α-olefin copolymer (A1) having a melting point of 100 to 140° C.

In one embodiment, the metallocene-type ethylene/α-olefin copolymer (A1) has an ethylene content of 7.0 to 10.0% by weight.

In one embodiment, the metallocene-type ethylene/α-olefin copolymer (A1) is a metallocene-type propylene/ethylene copolymer.

In one embodiment, 10 to 70 parts by weight of (A1) are contained, based on 100 parts by weight in total of (A) to (C).

The present invention also provides a paper product comprising adhesion portions in paper, that is an adherend, and the hot-melt adhesive according to any one of the above which is bonded and solidified at the plurality of adhesion portions.

DETAILED DESCRIPTION OF THE INVENTION

Effects of Invention

According to the present invention, a hot-melt adhesive is provided, which is excellent in adhesiveness in a wide temperature range from low temperature to high temperature (particularly high-temperature adhesiveness). For example, a paper product produced using the hot-melt adhesive of the present invention exhibits excellent thermal resistance.

Therefore, a paper product with the hot-melt adhesive of the present invention becomes less likely to be affected by heat of the contents to be packaged (packed).

Description of Embodiments

A hot-melt adhesive of the present invention comprises, as essential components, an olefin copolymer (A), a tackifying resin (B) and a wax (C).

In the present specification, the "hot-melt adhesive" refers to an adhesive, which is solid at normal temperature, but has fluidity by being heated and melted, can be applied to an object such as a substrate or an adherend, is cured and bonded by being cooled.

<Olefin Copolymer (A)>

The olefin copolymer (A) refers to a copolymer of olefins as monomers, and does not include homopolymers such as polyethylene and polypropylene. Examples of the olefin copolymer (A) include a copolymer of propylene and another α-olefin, and a copolymer of ethylene and another α-olefin. The α-olefin is an alkene in α-position of a carbon-carbon double bond, namely at the end.

In the olefin copolymer (A), as olefins, ethylene, propylene, 1-butene, 1-pentene, 1-hexene, 1-heptene, 1-octene, 1-nonene, 1-decene, cis-2-butene, trans-2-butene, isobutylene, cis-2-pentene, trans-2-pentene, 3-methyl-1-butene, 2-methyl-2-butene, 2, 3-dimethyl-2-butene and the like are specifically cited.

Specific examples of the olefin copolymer (A) include an ethylene/octene copolymer, an ethylene/butene copolymer, an ethylene/hexene copolymer, a propylene/ethylene copolymer, a propylene/1-butene copolymer, a terpolymer of propylene/ethylene/1-butene, a terpolymer of propylene/1-hexene/1-octene, and a terpolymer of propylene/1-hexene/methylpentene. These copolymers may be used alone or two or more may be mixed.

An example of a commercially available product of the olefin copolymer (A) includes Affinity GA1900 (trade name), Affinity GA1950 (trade name), Affinity EG8185 (trade name), Affinity EG8200 (trade name), Engage 8137 (trade name), Engage 8180 (trade name), Engage 8400 (trade name) manufactured by The Dow Chemical Company; Vestoplast 703 (trade name), Vestoplast 708 (trade name) manufactured by Evonik Degussa Japan Co., Ltd.; Vistamaxx 2330 (trade name), Vistamaxx 6202 (trade name), Vistamaxx 8880 (trade name) manufactured by Exxon Mobil Corporation; Eastoflex (trade name) E1016PL-1 manufactured by Eastman Chemical Company; Toughmer series manufactured by Mitsui Chemicals, Inc.; Evolue SP1071C, Evolue SP2030, Evolue SP2530S, Evolue SP4020 manufactured by Prime Polymer Co. Ltd.; Niporon Z HM510R, Niporon Z HM300K manufactured by Tosoh Corporation; WINTEC WMG03, WINTEC WSX03, WINTEC WMG03UX, WINTEC WMG02UX manufactured by Mitsubishi Chemical Corporation; and the like.

Regarding the olefin copolymer (A), it does not matter whether it is crystalline or non-crystalline as long as the objective of the present invention is not spoiled, but it preferably includes a crystalline olefin copolymer considering an improvement in adhesiveness.

Here, "crystalline" means what is usually called "crystalline", and more specifically refers to a state in which polymers are regularly arranged. Although "noncrystalline" usually means not crystalline, and more specifically it is defined as a state in which molecular chains of polymers are randomly arranged.

In the present invention, the "olefin copolymer (A)" includes a metallocene-type propylene/ethylene copolymer (A1) having a melting point of 100 to 140° C.

The melting point in the present specification refers to a value measured using differential scanning calorimetry (DSC). Specifically, using a DSC 6220 (trade name) manufactured by SII Nanotechnology Corporation, 10 mg of a sample is weighed in an aluminum container and measured at a temperature increasing rate of 10° C./min. The temperature at the top of the melting peak is referred to as the melting point.

The metallocene-type propylene/ethylene copolymer is a polymer produced by polymerizing ethylene and an α-olefin using a metallocene catalyst. The polymer produced using the metallocene catalyst has a very narrow molecular weight distribution and does not cause deviation in crystallinity. The metallocene-type ethylene/α-olefin copolymer is uniform in the arrangement of ethylene moieties and α-olefin moieties, the content ratio of each structural unit, and the like. Therefore, the possibility of the formation of low molecular weight compounds causing a decrease in adhesive force is lowered, and the adhesive force does not decrease.

When the melting point of the metallocene-type ethylene/α-olefin copolymer (A1) is in the range of 100 to 140° C., the thermal resistance is improved, and the hot-melt adhesive of the present invention is exceptionally excellent in adhesiveness at high temperatures, with adhesiveness at low temperatures being maintained.

When the melting point of the metallocene-type ethylene/α-olefin copolymer (A1) is lower than 100° C., the thermal resistance of the hot-melt adhesive is lowered, and adhesiveness at high temperatures is lowered. When the melting point of the metallocene-type ethylene/α-olefin copolymer is higher than 140° C., the hot-melt adhesive has excellent adhesiveness at high temperatures, but has low adhesiveness at low temperatures.

The metallocene-type ethylene/α-olefin copolymer (A1) preferably has an ethylene content of 7.0 to 10.0% by weight, more preferably 7.0 to 9.08 by weight, and most desirably 7.0 to 8.0% by weight. The ethylene content of the metallocene-type ethylene/α-olefin copolymer (A1) in the above range increases the melting point of the metallocene-type ethylene/α-olefin copolymer (A1), and the hot-melt adhesive of the present invention has excellent thermal resistance.

In addition, in the present specification, the ethylene content is a ratio of ethylene structures with respect to the total weight of ethylene and α-olefin polymers, and is taken as a value measured by the Exxon Mobil method based on ASTM method.

In the present invention, the metallocene-type ethylene/α-olefin copolymer (A1) is preferably a metallocene-type ethylene/propylene copolymer. (A1) having low melting-point polyethylene units and high melting-point polypropylene units, and containing large amounts of polypropylene units increases its melting point and contributes to improving the thermal resistance of the hot-melt adhesive.

An example of a commercially available product of the metallocene-type ethylene/α-olefin copolymer (A1) includes Vistamaxx A (prototype) manufactured by Exxon Mobil Corporation, and disclosed in Examples.

<Tackifying Resin (B)>

The tackifying resin (B) is not particularly limited as long as it is one usually used for a hot-melt adhesive and the hot-melt adhesive intended by the present invention can be obtained.

Examples of the tackifying resin include, for example, natural rosins, modified rosins, hydrogenated rosins, glycerol esters of natural rosins, glycerol esters of modified rosins, pentaerythritol esters of natural rosins, pentaerythritol esters of modified rosins, pentaerythritol esters of hydrogenated rosins, copolymers of natural terpenes, three-dimensional polymers of natural terpenes, hydrogenated derivatives of copolymers of hydrogenated terpenes, polyterpene resins, hydrogenated derivatives of phenol-based modified terpene resins, aliphatic petroleum hydrocarbon resins, hydrogenated derivatives of aliphatic petroleum hydrocarbon resins, aromatic petroleum hydrocarbon resins, hydrogenated derivatives of aromatic petroleum hydrocarbon resins, cyclic aliphatic petroleum hydrocarbon resins and hydrogenated derivatives of cyclic aliphatic petroleum hydrocarbon resins. These tackifying resins may be used alone or in combination. For the tackifying resin, liquid type tackifying resins may also be used as long as they are colorless to pale yellow in color tone, have substantially no odor, and have good thermal stability. Considering these properties comprehensively, hydrogenated derivatives of the above resins and the like are preferred as the tackifying resin.

As the tackifying resin, commercial products may be used. Examples of such commercial products include ECR 5600 (trade name) manufactured by Exxon Mobil Corporation, MARUKACLEAR H (trade name) manufactured by Maruzen Petrochemical Co., Ltd., Clearon K100 (trade name) manufactured by YASUHARA CHEMICAL Co., Ltd., ARKON M100 (trade name) manufactured by Arakawa Chemical Industries, Ltd., I MARV S100 (trade name), I MARV Y135 (trade name), I MARV P125 manufactured by Idemitsu Kosan Co., Ltd., Clearon K4090 and Clearon K4100 manufactured by YASUHARA CHEMICAL Co., Ltd., ECR231C (trade name), ECR179EX (trade name) manufactured by Exxon Mobil Corporation, T-REZ HC103 (trade name), T-REZ HA103 (trade name), T-REZ HA125 (trade name), T-REZ HB103 (trade name), T-REZ HA085 (trade name) manufactured by JXTG Nippon Oil & Energy Corporation, and REGALITE R7100 (trade name) manufactured by Eastman Chemical Company.

<Wax (C)>

"Wax (C)" is an organic substance having a weight-average molecular weight of less than 15000 which is solid at normal temperature, and becomes liquid when heated. The wax may be a synthetic wax or a natural wax.

Examples of the synthetic wax include Fischer-Tropsch waxes, polyolefin waxes (e.g., polyethylene wax, polypropylene wax, polyethylene/polypropylene wax) and the like.

"Fischer Tropsch waxes" refers to those which are synthesized by the Fischer-Tropsch method and generally referred to as Fischer-Tropsch waxes. The Fischer-Tropsch wax is a wax fractionated such that its component molecules have a narrow carbon number distribution from a wax whose component molecules relatively have a wide carbon number distribution.

As Fischer Tropsch wax, SASOL H1 (trade name), SASOL C80 (trade name) from Sasol Wax Company, and FT-115 (trade name) from NIPPON SEIRO CO., LTD. are commercially available.

The natural wax includes paraffin waxes, microcrystalline waxes and petrolatum.

The paraffin waxes are waxes which are solid at room temperature, and separated from vacuum distillation extracted oil. Examples of representative paraffin waxes include Paraffin Wax series manufactured by NIPPON SEIRO CO., LTD.

Microcrystalline waxes are waxes which are solid at room temperature, and separated and produced from a vacuum distillation bottom or heavy extract oil. Examples of representative microcrystalline waxes include Hi-Mic series manufactured by NIPPON SEIRO CO., LTD.

Petrolatum is a wax which is semi-solid at normal temperature, and separated and produced from the vacuum distillation bottom. Representative examples of the petrolatum include Centon CP series manufactured by CHUO YUKA CO., LTD.

These waxes may be used alone, or two or more may be mixed.

In the present invention, the wax (C) preferably has a melting point of 60 to 150° C., desirably 80 to 130° C., and most desirably 90 to 120° C. The thermal resistance and thermal stability of the hot-melt adhesive of the present invention are improved by increasing the melting point of the wax (C), so that excellent adhesive strength is achieved in a high temperature range. As for the melting point of Fischer Tropsch wax, the definition of the melting point of (A1) and measurement method thereof are similarly applied.

<Hot-Melt Adhesive>

In the hot-melt adhesive of the present invention, the blending amount of a metallocene-type ethylene/α-olefin copolymer (A1) is preferably 10 to 70 parts by weight, particularly preferably 30 to 70 parts by weight, and most desirably 35 to 65 parts by weight, based on 100 parts by weight in total of the components (A) to (C).

The blending amount of the metallocene-type ethylene/α-olefin copolymer (A1) in the above range improves the thermal resistance and thermal stability of the hot-melt adhesive, thus making it possible to improve adhesiveness at high temperatures, with adhesion at low temperatures being maintained.

In the hot-melt adhesive of the present invention, the blending amount of a tackifying resin (B) is preferably 20 to 60 parts by weight, particularly preferably 20 to 50 parts by weight, and most desirably 20 to 45 parts by weight, based on 100 parts by weight in total of the components (A) to (C).

The blending amount of the tackifying resin (B) in the above range improves initial adhesiveness of the hot-melt adhesive, and adhesiveness in a wide temperature range from low temperature to high temperature is maintained.

In the hot-melt adhesive of the present invention, the blending amount of a wax (C) is preferably 5 to 30 parts by weight, particularly preferably 10 to 25 parts by weight, and most desirably 15 to 25 parts by weight, based on 100 parts by weight in total of the components (A) to (C).

The blending amount of the wax (C) in the above range reduces viscosity of the hot-melt adhesive; improved compatibility between the respective components results in improved thermal resistance and thermal stability. Therefore, adhesiveness at high temperatures is improved, with adhesion at low temperatures being maintained.

The hot-melt adhesive of the present invention may further include other additives.

As such additives, for example, a plasticizer, a stabilizer (an ultraviolet absorber, an antioxidant), and a particulate filler may be cited.

The "plasticizer" is blended for the purpose of lowering the melt viscosity of the hot-melt adhesive, imparting flexibility, improving wettability to the adherend. There is no particular limitation as long as it is compatible with an ethylene-based copolymer, and the hot-melt adhesive intended by the present invention can be obtained. Examples of the plasticizer include paraffinic oils, naphthenic oils and aromatic oils. Particularly preferred are colorless, odorless paraffinic oils.

As the plasticizer (D), commercialized products may be used. Examples thereof include, for example, White Oil Broom 350 (trade name) manufactured by Kukdong Oil & Chemicals Co., Ltd.; Diana Fresia S32 (trade name), Diana Process Oil PW-90 (trade name) and DN Oil KP-68 (trade name) manufactured by IDEMITSU KOSAN CO., LTD.; Enerper M1930 (trade name) manufactured by BP Chemicals, Inc.; Kaydol (trade name) manufactured by Crompton Corporation; and Primol 352 (trade name) manufactured by ESSO. These plasticizers (D) may be used alone or in combination.

The "stabilizer" is blended to prevent molecular weight decrease, gelation, coloring, generation of odor and the like of the hot-melt adhesive due to heat, air, light and the like, thereby improving the stability of the hot-melt adhesive. It is not particularly limited as long as the hot-melt adhesive intended by the present invention can be obtained. As a stabilizer, for example, an antioxidant and an ultraviolet absorber may be cited.

"UV absorbers" are used to improve light resistance of the hot-melt adhesive. "Antioxidants" are used to prevent oxidative degradation of the hot-melt adhesive. Antioxidants and UV absorbers are generally used in hot melt adhesives, and are not particularly limited as long as the intended paper product described later can be obtained.

As an "antioxidant", for example, a phenol-based antioxidant, a sulfur-based antioxidant, and a phosphorus-based antioxidant may be cited. As an ultraviolet absorber, for example, a benzotriazole-based ultraviolet absorber and a benzophenone-based ultraviolet absorber may be cited. Furthermore, a lactone-based stabilizer may also be added. These may be used alone or in combination.

Commercialized products may be used as stabilizers. Examples thereof include Sumilyzer GM (trade name), Sumilyzer TPD (trade name) and Sumilyzer TPS (trade name) manufactured by Sumitomo Chemical Company, Limited; Irganox 1010 (trade name), Irganox HP2225FF (trade name), Irgafos 168 (trade name) and Irganox 1520 (trade name) manufactured by Ciba Specialty Chemicals Co.; Adekastab AO-60 (trade name) of ADEKA CORPORATION; JF77 (trade name), JP-650 (trade name) manufactured by JOHOKU CHEMICAL CO., LTD. These stabilizers may be used alone or in combination.

The hot-melt adhesive of the present invention may further include a particulate filler. The particulate filler may be one generally used, and is not particularly limited as long as the hot-melt adhesive intended by the present invention can be obtained. Examples of the "fine particle filler" include, for example, mica, calcium carbonate, kaolin, talc, titanium oxide, diatomaceous earth, urea resin, styrene beads, calcined clay, starch and the like. These shapes are preferably spherical, and the dimensions (diameter in the case of spherical) are not particularly limited.

The hot-melt adhesive of the present invention may be prepared, using a generally known method for producing a hot-melt adhesive, by blending an olefin copolymer (A), a tackifying resin (B), a wax (C), and, if necessary, the above-mentioned various additives. For example, it may be produced by blending predetermined amounts of the above components, and heating and melting them. The order of adding each component, the heating method, and the like are not particularly limited as long as the intended hot-melt adhesive can be obtained.

<Product with Hot-Melt Adhesive>

The hot-melt adhesive of the present invention is heated and melted, applied to adhesion portions of an adherend, brought into contact with another adherend with it remaining in a melted state as applied. Thereafter, it is cooled and solidified to bond the adherend. Examples of the adherend include, for example, electronic parts, woodwork, building materials, sanitary materials, paper materials and the like. Among them, paper, particularly paperboards are preferred.

The paper board means so-called cardboard paper, and refers to a generic term for thick paper made from wood pulp, used paper and the like (JIS P 0001 4001). A cardboard is a sheet in which a paper board liner is laminated on one side or both sides of a paper board serving as an inner core formed in a corrugated shape. The paper board used for the liner includes kraft liner (K liner) made from kraft pulp and used paper, jute liner (C liner) made from used paper and the like. A typical example of the cardboard includes an exterior cardboard described in JIS 1516.

A paper product of the present invention comprises adhesion portions on a paper material, that is an adherend, and a hot-melt adhesive which is bonded and solidified at the plurality of adhesion portions. The paper material may be a single member, for example, when assembling a cardboard box. Alternatively, it may be a plurality of members, as in the case of making a craft product.

The type of paper product is not particularly limited, but typically, bookbinding, a calendar, a cardboard packaging container, a carton and the like may be cited. Considering the characteristics of the hot-melt adhesive of the present invention, a paper product composed of paper boards such as cardboard packaging containers and cartons is particularly effective as the paper product of the present invention.

The method of applying the hot-melt adhesive to the adhesion portions is not particularly limited as long as the intended paper product can be obtained, but a hot melt applicator is widely used. As the hot melt applicator, for example, ProBlue P4 Melter (trade name), ProBlue P10 Melter (trade name) manufactured by Nordson Corporation and the like may be cited.

The application method is roughly categorized into, for example, contact application and non-contact application. "Contact application" refers to an application method in which a jet machine is brought into contact with a member or film when applying a hot-melt adhesive, whereas "non-contact coating" refers to a method in which a hot-melt adhesive is not brought into contact with a member or film when applying a hot-melt adhesive. As the contact application method, for example, slot coater application, roll coater application and the like may be cited, whereas as the non-contact application method, for example, spiral application which enables applying in a spiral form, omega application and control seam application which enable applying in a wavy form, slot spray application and curtain spray application which enable surface applying, dot application which enables dot-like applying, bead application which enables linear applying, and the like may be cited.

When applying the hot-melt adhesive of the present invention with the hot melt applicator (even when the hot-melt adhesive is discharged in a horizontal direction with respect to the ground with the hot melt applicator to perform applying), a thread-form material of the hot-melt adhesive is hardly discharged. Therefore, areas other than the adhesion portions of the adherend or a peripheral area of a jetting port of the applicator is not smeared with the thread-form material.

The present invention will hereinafter be described using examples and comparative examples for the purpose of describing the present invention in more detail and more specifically. These examples are for the purpose of describing the present invention, and not intended to limit the present invention. The ratios shown in the examples are based on the weight of non-volatile contents unless otherwise stated.

EXAMPLES

Raw materials of the hot-melt adhesive, and formulations, evaluation methods are described below.

(A) Olefin Copolymer
- (A1-1) Metallocene-type propylene/ethylene copolymer (ethylene content: 7.1 wt %, melting point: 112° C., melt viscosity at 190° C.: 1850 mPas, Vistamaxx A (prototype) manufactured by Exxon Mobil Corporation)
- (A1-2) Metallocene-type ethylene/hexene copolymer (ethylene content: less than 5 wt %, melting point: 100° C., melt flow rate: 10 g/min, Evolue SP1071C (trade name) manufactured by Prime Polymer Co. Ltd.)
- (A1-3) Metallocene-type ethylene/hexene copolymer (ethylene content: less than 5 wt %, melting point: 127° C., melt flow rate: 1.8 g/min, Evolue SP4020 (trade name) manufactured by Prime Polymer Co. Ltd.)
- (A2) Metallocene-type propylene/ethylene copolymer (ethylene content: 6.0 wt %, melting point: 97° C., melt viscosity at 190° C.: 1200 mPas, Vistamaxx 8880 (trade name) manufactured by Exxon Mobil Corporation)

(A3) Metallocene-type ethylene/octene copolymer (1-octene content: 35 to 37 wt %, melting point: 70° C., melt flow rate: 500 g/10 min, Affinity GA 1950 (trade name) manufactured by The Dow Chemical Company)

(A4) Metallocene-type ethylene/octene copolymer (1-octene content: 30 to 40% by weight, melting point: 70° C., melt flow rate: 1250 g/10 min, Affinity GA 1875 (trade name) manufactured by The Dow Chemical Company)

(A5) Metallocene-type ethylene/octene copolymer (1-octene content: 30 to 40 wt %, melting point: 68° C., melt flow rate: 660 g/10 min, Affinity GA 1000R (trade name) manufactured by The Dow Chemical Company)

(A6) Metallocene-type propylene/ethylene copolymer (melting point: 142° C., WINTEC WMG03 (trade name) manufactured by Mitsubishi Chemical Corporation)

(B) Tackifying resin (B1) Hydrogenated alicyclic/aromatic copolymer hydrocarbon resin (softening point: 103° C., T-REZ HC103 (trade name) manufactured by JXTG Energy Corporation)

(B2) Hydrogenated alicyclic hydrocarbon resin (softening point: 103° C., T-REZ HA103 (trade name) manufactured by JXTG Energy Corporation)

(B3) Hydrogenated alicyclic hydrocarbon resin (softening point: 125° C., T-REZ HA125 (trade name) manufactured by JXTG Energy Corporation)

(C) Wax (C1) Fischer-Tropsch wax (melting point: 108° C., penetration 2, SAZOL WAX H1 (trade name) manufactured by Sasol Co.)

(C2) Paraffin wax (melting point: 69° C., penetration 12, Paraffin 155F (trade name) manufactured by NIPPON SEIRO CO., LTD.)

(C3) Microcrystalline wax (melting point: 84° C., penetration 12, Himic 1080 (trade name) manufactured by NIPPON SEIRO CO., LTD.)

(C4) Polyethylene wax (melting point: 109° C., penetration 7, High Wax 320P (trade name) manufactured by Mitsui Chemicals, Inc.)

(C5) Polypropylene wax (melting point: 140/148° C., penetration 1 or less, High Wax NP 105 (trade name) manufactured by Mitsui Chemicals, Inc.)

(D) Antioxidant (D1) Phenol-based antioxidant (Adekastab A060 (trade name) manufactured by ADEKA CORPORATION)

(D2) Phosphorus-based antioxidant (JP650 (trade name) manufactured by JOHOKU CHEMICAL CO., LTD.)

(D3) Sulfur-based antioxidant (Sumilyzer TPS (trade name) manufactured by Sumitomo Chemical Company, Limited)

These components were melted and mixed in the ratios (parts by weight) shown in Tables 1 and 3. The respective components were melted and mixed at about 150° C. for about one hour using a universal stirrer to produce hot-melt adhesives of Examples 1 to 9 and Comparative Examples 1 to 5. Thermal resistance, adhesiveness and thermal stability of the hot-melt adhesives of the Examples and the Comparative Examples were evaluated by the following methods. The evaluation results are shown in Tables 2 and 4.

For the thermal resistance and thermal stability, a hot-melt adhesive was applied to a K-liner cardboard to obtain a sample. For the thermal stability, the hot-melt adhesive was stored under a 180° C. atmosphere for 72 hours, and viscosity change rate and formation of carbide were confirmed. A summary of each evaluation is described below.

<Thermal Resistance>
(Sample Preparation)

A hot-melt adhesive melted at 180° C. was applied to a K liner cardboard, which was laminated to a K-liner cardboard under the conditions of an application amount of 2 g/m, a setting time of 10 seconds, an open time of 3 seconds, and a pressing pressure of 1 kg/25 cm$^2$.

(Evaluation Method)

The prepared sample was subjected to a load of 300 g/25 cm$^2$ in a stress direction under a 70° C. atmosphere, and the time until the laminated sample was peeled off was measured. Evaluation criteria are as follows.

◎: Peel-off time is longer than 5 hours
○: Peel-off time is 2 hours to 5 hours
×: Peel-off time is less than 2 hours <Adhesiveness>
(Sample Preparation)

A hot-melt adhesive melted at 180° C. was applied to a K liner cardboard, which was laminated to a K-liner cardboard under the conditions of an application amount of 2 g/m, a setting time of 10 seconds, an open time of 3 seconds, and a pressing pressure of 1 kg/25 cm$^2$.

(Evaluation Method)

The prepared sample was aged for 24 hours in a thermostatic chamber set at 70° C., 23° C., or −10° C., and then forcibly peeled off by hand under the atmosphere. The rate of breakage of the K-liner cardboard of the total bonded area was taken as a material breakage rate (rate of material broken), and the appearance was evaluated. Evaluation criteria are as follows.

◎: Material breakage rate is higher than 80%
○: Material breakage rate is 60% to 80%
Δ: Material breakage rate is 40% or more and less than 60%
×: Material breakage rate is less than 40%<

<Thermal Stability>
(Sample Preparation)

20 g of a hot-melt adhesive was put in a 70 cc glass bottle and stored for 72 hours in a 180° C. thermostatic chamber. 1) Viscosity increase-decrease rate, and 2) formation of carbide were confirmed. Evaluation criteria are as follows.

(Evaluation Method)

1) Viscosity Change Rate

The viscosity increase-decrease rate is an increased or decreased ratio of the viscosity at 180° C. of the hot-melt adhesive after one week to the initial viscosity at 180° C. of the hot-melt adhesive.

Specifically, it was calculated by the following formula.

$$\text{Viscosity increase-decrease rate (\%)} = (\text{melt viscosity after storage for 1 week at 180° C.}) \times 100/(\text{initial viscosity at 180° C.}) - 100$$

Evaluation criteria are as follows.

◎: Viscosity increase-decrease rate is less than 5%
○: Viscosity increase-decrease rate is 5% to 10%
Δ: Viscosity increase-decrease rate is more than 10% and less than 20%
×: Viscosity increase-decrease rate is 20% or more 2) Formation of Carbide Evaluation criteria are as follows.

◎: No carbide
○: Slight carbide formation
Δ: Carbide formation
×: Considerable carbide formation

TABLE 1

| | | Example | | | | | | |
|---|---|---|---|---|---|---|---|---|
| | | 1 | 2 | 3 | 5 | 6 | 7 | 8 |
| A | Olefin copolymer | | | | | | | |
| A1-1 | Metallocene-type propylene/ethylene copolymer "Vistamaxx A" | 60 | 50 | 40 | 30 | 15 | 18 | 40 |
| A1-2 | Metallocene-type ethylene/hexene copolymer "Evolue SP1071C" | | | | 10 | | | |
| A1-3 | Metallocene-type ethylene/hexene copolymer "Evolue SP4020" | | | | | | | |
| A2 | Metallocene-type propylene/ethylene copolymer "Vistamaxx 8880" | | | | 5 | 15 | 10 | |
| A3 | Metallocene-type ethylene/octene copolymer "Affinity GA 1950" | | | | | 5 | 5 | |
| A4 | Metallocene-type ethylene/octene copolymer "Affinity GA 1875" | | 10 | | | | | |
| A5 | Metallocene-type ethylene/octene copolymer "Affinity GA 1000R" | | | 10 | | | 3 | 15 |
| A6 | Metallocene-type propylene/ethylene copolymer "WINTEC WMG03" | | | | | | | |
| B | Tackifying resin | | | | | | | |
| B1 | Hydrogenated alicyclic/aromatic copolymer hydrocarbon resin "T-REZ HC103" | 25 | 25 | 20 | 26 | 5 | 5 | 23 |
| B2 | Hydrogenated alicyclic hydrocarbon resin ""T-REZ HA103" | | | | | | | |
| B3 | Hydrogenated alicyclic hydrocarbon resin "T-REZ HA125" | | | 10 | 11 | 40 | 40 | |
| C | Wax | | | | | | | |
| C1 | Fischer Tropsch wax "SASOL H1" | | | 20 | 15 | 20 | 17 | 20 |
| C2 | Paraffin wax "Paraffin 155F" | | | | | | | 2 |
| C3 | Microcrystalline wax "Himic 1080" | | | | | | | |
| C4 | Polyethylene wax "Hiwax 320 P" | 15 | 15 | | | | | |
| C5 | Polypropylene wax "Hiwax NP105" | | | | 3 | | 2 | |
| | Total of A-C | 100 | 100 | 100 | 100 | 100 | 100 | 100 |
| D | Antioxidant | | | | | | | |
| D1 | Phenol-based "Adekastab AO60" | 0.3 | 0.3 | 0.3 | 0.3 | 0.3 | 0.3 | 0.3 |
| D2 | Phosphorus-based "JP650" | 0.3 | 0.3 | 0.3 | 0.3 | 0.3 | 0.3 | 0.3 |
| D3 | Sulfur-based "Sumilyzer TPS" | 0.3 | 0.3 | 0.3 | 0.3 | 0.3 | 0.3 | 0.3 |

TABLE 2

| Performance test results | | Example | | | | | | |
|---|---|---|---|---|---|---|---|---|
| | | 1 | 2 | 3 | 5 | 6 | 7 | 8 |
| Adhesiveness | 70° C. | ◎ | ◎ | ◎ | ○ | ○ | ○ | ◎ |
| | 23° C. | ◎ | ◎ | ◎ | ○ | ◎ | ◎ | ◎ |
| | −10° C. | ○ | ○ | ○ | ○ | ◎ | ◎ | ◎ |
| Thermal stability | Formation of carbide | ◎ | ◎ | ○ | ○ | ○ | ○ | ◎ |
| | Viscosity increase-decrease rate | ◎ | ◎ | ◎ | ◎ | ◎ | ◎ | ○ |
| Thermal resistance | 70° C. | ◎ | ◎ | ◎ | ○ | ○ | ○ | ◎ |

TABLE 3

| | | Example | Comparative Example | | | | |
|---|---|---|---|---|---|---|---|
| | | 9 | 1 | 2 | 3 | 4 | 5 |
| A | Olefin copolymer | | | | | | |
| A1-1 | Metallocene-type propylene/ethylene copolymer "Vistamaxx A" | 30 | | | | 45 | 45 |
| A1-2 | Metallocene-type ethylene/hexene copolymer "Evolue SP1071C" | | | | | | |
| A1-3 | Metallocene-type ethylene/hexene copolymer "Evolue SP4020" | 10 | | | | | |
| A2 | Metallocene-type propylene/ethylene copolymer "Vistamaxx 8880" | 5 | 20 | | 20 | | |
| A3 | Metallocene-type ethylene/octene copolymer "Affinity GA 1950" | | 20 | 40 | | 15 | 15 |
| A4 | Metallocene-type ethylene/octene copolymer "Affinity GA 1875" | | | | | | |
| A5 | Metallocene-type ethylene/octene copolymer "Affinity GA 1000R" | | | | | | |
| A6 | Metallocene-type propylene/ethylene copolymer "WINTEC WMG03" | | | | 20 | | |
| B | Tackifying resin | | | | | | |
| B1 | Hydrogenated alicyclic/aromatic copolymer hydrocarbon resin "T-REZ HC103" | 26 | 26 | 20 | 20 | | 40 |
| B2 | Hydrogenated alicyclic hydrocarbon resin ""T-REZ HA103" | | 15 | | | | |
| B3 | Hydrogenated alicyclic hydrocarbon resin "T-REZ HA125" | 11 | | 20 | 20 | | |
| C | Wax | | | | | | |
| C1 | Fischer Tropsch wax "SASOL H1" | 15 | 19 | 20 | 20 | 40 | |
| C2 | Paraffin wax "Paraffin 155F" | | | | | | |
| C3 | Microcrystalline wax "Himic 1080" | | | | | | |
| C4 | Polyethylene wax "Hiwax 320 P" | | | | | | |
| C5 | Polypropylene wax "Hiwax NP105" | 3 | | | | | |
| | Total of A-C | 100 | 100 | 100 | 100 | 100 | 100 |
| D | Antioxidant | | | | | | |
| D1 | Phenol-based "Adekastab AO60" | 0.3 | 0.3 | 0.3 | 0.3 | 0.3 | 0.3 |

TABLE 3-continued

|  |  | Example | Comparative Example | | | | |
|---|---|---|---|---|---|---|---|
|  |  | 9 | 1 | 2 | 3 | 4 | 5 |
| D2 | Phosphorus-based "JP650" | 0.3 | 0.3 | 0.3 | 0.3 | 0.3 | 0.3 |
| D3 | Sulfur-based "Sumilyzer TPS" | 0.3 | 0.3 | 0.3 | 0.3 | 0.3 | 0.3 |

TABLE 4

|  |  | Example | Comparative Example | | | | |
|---|---|---|---|---|---|---|---|
| Performance test results | | 9 | 1 | 2 | 3 | 4 | 5 |
| Adhesiveness | 70° C. | ○ | X | X | ⊚ | ○ | ○ |
|  | 23° C. | ○ | ⊚ | ⊚ | ○ | X | X |
|  | −10° C. | ○ | ○ | ⊚ | X | X | X |
| Thermal stability | Formation of carbide | ○ | ⊚ | ⊚ | ○ | X | X |
|  | Viscosity increase-decrease rate | ⊚ | ⊚ | ⊚ | ○ | X | X |
| Thermal resistance | 70° C. | ○ | X | X | ○ | ○ | ○ |

As shown in Table 2 and Table 4, the hot-melt adhesives of Examples 1 to 9 are excellent in thermal resistance, thermal stability, and provide high adhesiveness over a wide temperature range (−10 to 70° C.). Since the adhesiveness at 70° C. is particularly high, when packing a package with a packaging material such as cardboard, packing work may proceed without worrying about the heat of the contents (packages).

On the other hand, the hot-melt adhesives of Comparative Examples 1 to 5 are significantly inferior in any one of the thermal resistance, thermal stability and adhesiveness.

Since the hot-melt adhesives of Comparative Examples 1, 2 do not contain the component (A1), and the melting point as the component (A) is lowered, the thermal resistance is low and adhesiveness at high temperatures is low.

The hot-melt adhesive of Comparative Example 3 does not contain the component (A1) but contains the component (A6), so that the melting point as the component (A) becomes too high and adhesiveness at low temperatures (−10° C.) is low.

The hot-melt adhesive of Comparative Example 4 does not contain the tackifying resin (B), and the hot-melt adhesive of Comparative Example 5 does not contain the wax (C). Therefore, the hot-melt adhesives of Comparative Examples 4 and 5 have low adhesiveness from normal temperature (23° C.) to low temperature (−10° C.) and also have poor thermal stability.

INDUSTRIAL APPLICABILITY

The present invention provides a hot-melt adhesive. The hot-melt adhesive of the present invention may be used in paper processing fields in general, and is suitable for assembling cardboard and the like or for preventing slips.

The invention claimed is:

1. A hot-melt adhesive consisting of: a single olefin copolymer (A), a tackifying resin (B) a wax (C) and an antioxidant (D), wherein
    the single olefin copolymer (A) is a propylene/ethylene copolymer (A1) prepared with a metallocene catalyst and having a melting point of 100 to 140° C. and an ethylene content of 7.0 to 10.0% by weight.

2. The hot-melt adhesive according to claim 1, wherein 10 to 70 parts by weight of the (A1) are contained, based on 100 parts by weight in total of (A) to (C).

3. A paper product comprising adhesion portions in paper, that is an adherend, and the hot-melt adhesive according to claim 1 which is bonded and solidified at the plurality of adhesion portions.

* * * * *